US012674119B2

(12) United States Patent
Courchay et al.

(10) Patent No.: US 12,674,119 B2
(45) Date of Patent: Jul. 7, 2026

(54) WATER-SOLUBLE MULTICOMPARTMENT UNIT DOSE ARTICLE

(71) Applicant: The Procter & Gamble Company, Cincinnati, OH (US)

(72) Inventors: Florence Catherine Courchay, Brussels (BE); Karel Jozef Maria Depoot, Brussels (BE); Robby Renilde François Keuleers, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 281 days.

(21) Appl. No.: 18/483,717

(22) Filed: Oct. 10, 2023

(65) Prior Publication Data

US 2024/0132811 A1 Apr. 25, 2024

(30) Foreign Application Priority Data

Oct. 10, 2022 (EP) .................................... 22200489

(51) Int. Cl.
*C11D 17/00* (2006.01)
*C11D 1/83* (2006.01)

(52) U.S. Cl.
CPC ............ *C11D 17/0039* (2013.01); *C11D 1/83* (2013.01); *C11D 2111/12* (2024.01)

(58) Field of Classification Search
CPC ... C11D 17/0039; C11D 1/83; C11D 2111/12; C11D 17/043; B65D 65/46
USPC .......................................................... 510/293
See application file for complete search history.

(56) References Cited

U.S. PATENT DOCUMENTS

| | | | | |
|---|---|---|---|---|
| 6,586,381 | B1 * | 7/2003 | Mondin | C11D 1/83 510/293 |
| 10,513,588 | B2 | 12/2019 | Friedrich et al. | |
| 2008/0185347 | A1 | 8/2008 | Tufano et al. | |
| 2017/0166846 | A1 | 6/2017 | Boutique et al. | |
| 2017/0369823 | A1 | 12/2017 | Souter et al. | |
| 2019/0093054 | A1 * | 3/2019 | Patterson | C11D 17/045 |
| 2020/0131457 | A1 * | 4/2020 | Depoot | C11D 3/43 |
| 2022/0025303 | A1 * | 1/2022 | Courchay | B29C 65/4895 |
| 2022/0119745 | A1 * | 4/2022 | Barros | C11D 3/1233 |
| 2022/0162523 | A1 * | 5/2022 | Andriessen | C11D 3/43 |

(Continued)

FOREIGN PATENT DOCUMENTS

| | | | | |
|---|---|---|---|---|
| EP | 3741836 | A1 * | 11/2020 | C11D 17/043 |
| EP | 3926030 | A1 * | 12/2021 | C11D 17/043 |

OTHER PUBLICATIONS

PCT Search Report and Written Opinion for PCT/US2023/076402 dated Feb. 12, 2024, 12 pages.

(Continued)

*Primary Examiner* — Eisa B Elhilo
(74) *Attorney, Agent, or Firm* — Abigail O. Idokogi; Andrew J. Mueller

(57) ABSTRACT

The present invention relates to a water-soluble, multicompartment unit dose article comprising at least two superposed compartments, wherein the compartments are formed by sealing water soluble film to contain liquid detergent composition. The water-soluble film comprises polyvinyl alcohol polymer comprising an anionic polyvinyl alcohol copolymer, or a blend of polyvinyl alcohol copolymers. The total volume of the liquid detergent composition is from 12 ml.

19 Claims, 2 Drawing Sheets

(56) References Cited

U.S. PATENT DOCUMENTS

2022/0186157 A1* 6/2022 Courchay ............ C11D 17/045

OTHER PUBLICATIONS

Extended EP Search Report and Search Opinion for 22200489.7 dated Mar. 16, 2023, 10 pages.
Extended EP Search Report and Written Opinion for 23202789.6 dated Feb. 27, 2024 , 9 pages.

* cited by examiner

WATER-SOLUBLE MULTICOMPARTMENT UNIT DOSE ARTICLE

FIELD OF THE INVENTION

A water-soluble multicompartment unit dose article comprising individual compartments in a superposed configuration.

BACKGROUND OF THE INVENTION

Water-soluble unit dose articles are liked by consumers as they are convenient and efficient to use. Such water-soluble unit dose articles often comprise laundry detergent compositions. Each unit dose article in principle provides sufficient laundry detergent composition to wash a single load of laundry.

Such water-soluble unit dose articles have been commercialized in a variety of designs, including designs having multiple compartments. Multiple compartments may be positioned in a side-by-side configuration, in a superposed configuration, or in a mixed configuration in which multiple compartments positioned in a side-by-side configuration are superposed on one ore more other compartments. An example of such a mixed configuration are the Tide or Ariel Pods products, as commercialized by The Procter & Gamble Company.

A particular challenge with packing superposed or mixed side-by-side/superposed pouch configurations is that upon transporting them from the making conveyer to the packing conveyer, due to their more rounded base shape and single contact point with the transfer belt, they can move and change their relative position towards each other and upon contact start sticking to each other, potentially resulting in a blockage of the transfer belt and/or a miscount of number of articles inside the final package. This challenge is hardly present or even absent with side by side designs as due to their multiple contact points with the transporting belt making them less sensitive for relative movement.

Therefore, there is a need for compacted water-soluble unit dose articles in which the multiple compartments are positioned in a superposed configuration while mitigating pouch stickiness risk upon transfer between the making and packing unit, without the need for an additional process transformation such as a dusting operation.

It was surprisingly found that a multi-compartment water-soluble unit dose article comprising a water-soluble film according to the present invention overcame this issue.

SUMMARY OF THE INVENTION

The present invention relates to a unit dose article comprising a water-soluble film and at least one liquid detergent composition, wherein each liquid detergent composition is encapsulated within a compartment formed by the water-soluble film. The unit dose article comprises at least a first compartment and at least a second compartment, wherein the second compartment is superposed relative to the first compartment, and wherein each compartment is formed by a seal which surrounds the compartment to contain the liquid detergent composition. The water-soluble film comprises polyvinyl alcohol polymer and wherein the polyvinyl alcohol polymer comprises an anionic polyvinyl alcohol copolymer, or a blend of anionic polyvinyl alcohol copolymers. The total volume of the liquid detergent composition is from 10 ml to 20 ml.

DETAILED DESCRIPTION OF THE INVENTION

Water-Soluble Multicompartment Pouch

Figure 1:
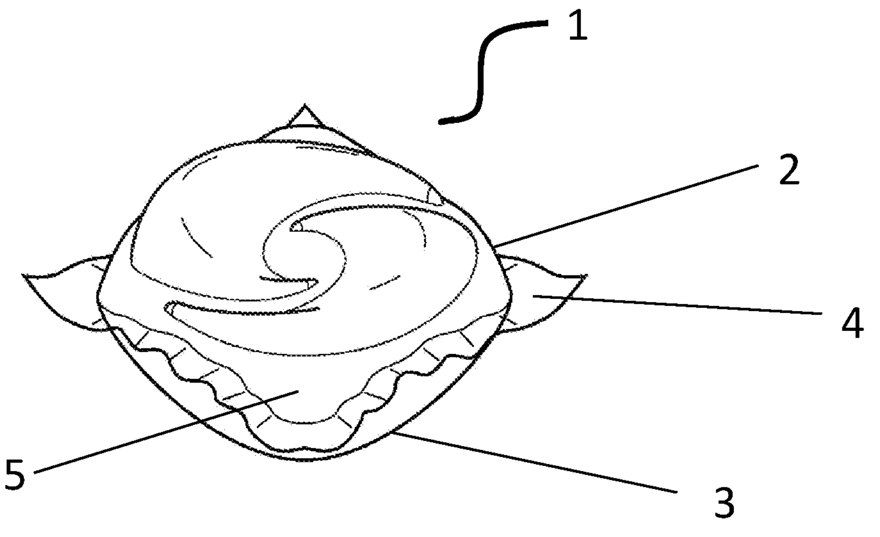
FIG. 1 is a water-soluble unit dose article according to the present invention.

The present invention relates to a water-soluble multi-compartment unit dose article comprising a water-soluble film and a laundry detergent composition.

Multiple compartment, also referred to herein as multi-compartment, unit dose articles comprise two or more compartments.

Superposed multiple compartment unit dose articles, when placed in stable equilibrium on a horizontal surface, comprise at least a first compartment in contact with the horizontal surface and at least a second compartment, positioned above the first compartment and separated from the horizontal surface.

At least one compartment comprises the laundry detergent composition, however the laundry detergent composition may be comprised in at least two compartments or even at least three compartments. The water-soluble film is sealed such that the laundry detergent composition does not leak out of the compartments during storage. However, upon addition of the water-soluble unit dose article to water, the water-soluble film dissolves and releases the contents of the internal compartment into the wash liquor.

Each compartment should be understood as meaning a closed internal space within the unit dose article, which holds the laundry detergent composition. The unit dose article is manufactured such that the water-soluble films completely surround the laundry detergent composition and in doing so defines the compartment in which the laundry detergent composition resides. The film is described in more detail below.

The unit dose article comprises at least two compartments, or even at least three compartments, or even at least four compartments, in which at least two compartments are present in a superposed position, i.e. one positioned on top of the other. The unit dose article may further comprise compartments positioned in a side-by-side orientation, i.e. one orientated next to the other, or even be orientated in a 'tyre and rim' arrangement, i.e. a first compartment is positioned next to a second compartment, but the first compartment at least partially surrounds the second compartment, but does not completely enclose the second compartment, or alternatively, one compartment may be completely enclosed within another compartment.

One of the compartments may be smaller than the other compartment. Wherein the unit dose article comprises at least three compartments, two of the compartments may be smaller than the third compartment, and preferably the smaller compartments are superposed on the larger compartment. Wherein the unit dose article comprises at least four compartments, three of the compartments may be smaller than the fourth compartment, and preferably the smaller compartments are superposed on the larger compartment. The superposed compartments preferably are orientated side-by-side.

In a multi-compartment orientation, the laundry detergent composition according to the present invention may be comprised in at least one of the compartments. It may for example be comprised in just one compartment, or may be comprised in two compartments, or even in three compartments, or even in all compartments present.

Each compartment may comprise the same or different compositions. The different compositions could all be in the same form, or they may be in different forms, for example liquid or powder.

Preferably the water-soluble unit dose article comprises one larger compartment with at least one, preferably at least two, or even at least three smaller compartments superposed thereon. All compartments comprise a liquid detergent composition. The water-soluble unit dose article comprises between 10 g and 22 g, preferably between 12 g and 20 g of a laundry detergent, all liquid laundry detergent. The water-soluble unit dose article consists of between 12 ml and 18 ml of a liquid laundry detergent. Preferably more than 60%, even more preferably more than 65%, most preferably between 70% and 75% by volume of the laundry detergent is comprised in the larger bottom compartment.

The outer contouring seal area includes or preferably consists of a flange area. A flange area is arranged around the perimeter of the water-soluble multicompartment unit dose article, and the flange comprises sealed film from two, three, or more water-soluble films. In other words, the flange area protrudes out from the water-soluble unit dose article and comprises sealed film. By 'seal area' we herein mean both the inner seal area as defined as the areas of film sealed together to define the individual compartments without the presence of a flange as well as the outer seal area defining a flange of the water-soluble unit dose article. Herein the flange excludes the inner seal areas. Preferably, the flange comprises sealed film from at least the first water-soluble film, the second water-soluble film and the third water-soluble film. The inner seal area can be created by sealing two water-soluble films together to create physically separated individual compartments, or can be created by sealing at least three films together to create physically separated individual compartments. Preferably the inner seal is created by sealing solely two water soluble films together.

Preferably, the water-soluble multicompartment unit dose article excluding a flange has a length and a width wherein each of the length and width are independently smaller than 50 mm, preferably between 30 mm and 48 mm, more preferably between 35 mm and 45 mm, preferably wherein the width to length ratio is between 0.5 and 1.5, preferably between 0.75 and 1.25, even more preferably between 0.85 and 1.15, most preferably between 0.9 and 1.1. The water-soluble unit dose article preferably comprises a flange in which the flange has a width of between 1 mm and mm, preferable between 4 mm and 8 mm. More preferably the water-soluble multicompartment unit dose article further has a maximum height, wherein the maximum height is smaller than 29 mm, preferably between 15 mm and 27 mm, more preferably between 20 mm and 26 mm, and wherein each of the width to height and length to height ratio with width and height including a flange independently are between 1.25 and 3.5, preferably between 1.5 and 2.5. Preferably each of the width to height and length to height ratio excluding the flange independently are between 1 and 3, preferably between 1.25 and 2.

FIG. 1 discloses a water-soluble unit dose article 1 according to the present invention. The water-soluble unit dose article 1 comprises a first water-soluble film 2 and a second water-soluble film (not shown, separating the top compartment from the bottom compartment) and a third water-soluble film 3 which are sealed together. Unit dose article 1 also includes a flange 4. The laundry detergent composition 5 is comprised within the water-soluble soluble unit dose article 1.

Figure 2A:
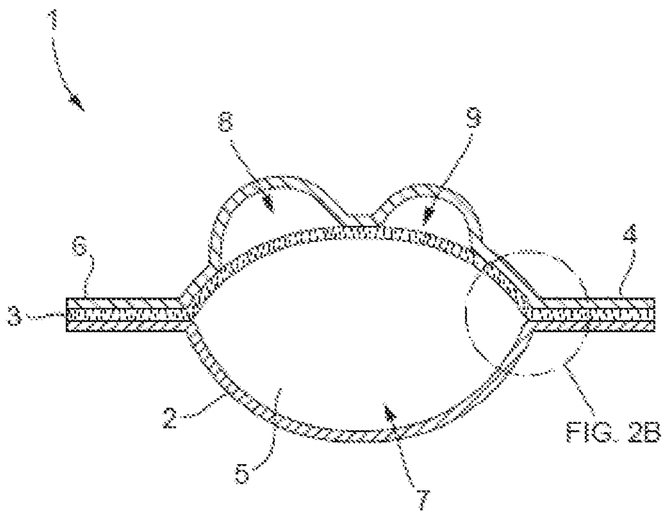
FIG. 2A is a cross-section through the unit dose article of FIG. 1.
Figure 2B:
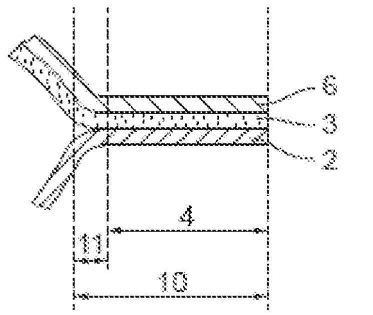
FIG. 2B is an enlarged portion of the seal section of FIG. 2A.

FIG. 2A and FIG. 2B disclose a cross-sectional view of water-soluble unit dose article 1. The cross-section discloses the first water-soluble film 2, the second water-soluble film 3 and a third water-soluble film 6. The water-soluble unit dose article 1 comprises a first compartment 7, a second compartment 8 and a third compartment 9. The water-soluble unit dose article 1 comprises a seal area 10, which comprises an inner seal area 11 and a flange 4. The second water-soluble film 3 and the third water-soluble film 6 are sealed together to define the second compartment 8 and the third compartment 9.

Without wishing to be bound by theory, multi-compartment water soluble unit dose articles have become more common within the laundry detergent market, the multi-compartment element providing formulators the flexibility of co-formulating intrinsically incompatible materials together within the same product. It is believed that multi-compartment water soluble unit dose articles when designed in a superposed configuration have a higher risk of moving around due to the single point of contact between the article and the transfer belt, and hence potentially start sticking to each other upon transport on a transfer belt, as such leading to a potential blockage of the transfer belt or a miscount of number of water-soluble unit dose articles within the final packaging. It was surprisingly found that a combined compaction of the total detergent in combination with the proper selection of water-soluble resin chemistry helps controlling the relative friction between the water-soluble unit-dose articles and as such mitigate the risk of articles sticking together, hence reduces transfer belt blockages and case count failures.

Water-Soluble Film

The film of the present invention is soluble or dispersible in water. The water-soluble film preferably has a thickness prior to deformation of from to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-moulding, extrusion or blown extrusion of the polymeric material, as known in the art.

The water-soluble film comprises polyvinyl alcohol polymer wherein the polyvinyl alcohol polymer comprises an anionic polyvinyl alcohol copolymer, or a blend thereof, preferably wherein the anionic polyvinylalcohol copolymers are selected from sulphonated and carboxylated anionic polyvinylalcohol copolymers especially carboxylated anionic polyvinylalcohol copolymers. Most preferably the water-soluble film comprises a blend of a polyvinylalcohol homopolymer and a carboxylated anionic polyvinylalcohol copolymer, or alternatively, the polyvinylalcohol consists of an anionic polyvinyl alcohol copolymer, most preferably a carboxylated anionic polyvinylalcohol copolymer. When the polyvinylalcohol in the water-soluble film is a blend of a polyvinylalcohol homopolymer and a carboxylated anionic polyvinylalcohol copolymer, the homopolymer and the anionic copolymer are present in a relative weight ratio of 90/10 to 10/90, preferably 80/20 to 20/80, more preferably 70/30 to 50/50. General classes of anionic monomer units which can be used for the anionic polyvinyl alcohol copolymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. Preferably, the anionic moiety of the first anionic monomer unit is selected from a sulphonate, a carboxylate, or a mixture thereof, more preferably a carboxylate, most preferably an acrylate, a methacrylate, a maleate, or a mixture thereof. Preferably, the anionic monomer unit is present in the anionic polyvinyl alcohol copolymer in an average amount in a range of between 1 mol. % and 10 mol. %, preferably between 2 mol. % and 5 mol. %.

The polyvinyl alcohol polymer may be present between 50% and 95%, preferably between 55% and 90%, more preferably between 60% and 80% by weight of the water-soluble film.

Without wishing to be bound by theory, the term "homopolymer" generally includes polymers having a single type of monomeric repeating unit (e.g., a polymeric chain comprising or consisting of a single monomeric repeating unit). For the particular case of polyvinyl alcohol, the term "homopolymer" further includes copolymers having a distribution of vinyl alcohol monomer units and optionally vinyl acetate monomer units, depending on the degree of hydrolysis (e.g., a polymeric chain comprising or consisting of vinyl alcohol and vinyl acetate monomer units). In the case of 100% hydrolysis, a polyvinyl alcohol homopolymer can include only vinyl alcohol units. Without wishing to be bound by theory, the term "copolymer" generally includes polymers having two or more types of monomeric repeating units (e.g., a polymeric chain comprising or consisting of two or more different monomeric repeating units, whether as random copolymers, block copolymers, etc.). For the particular case of polyvinyl alcohol, the term "copolymer" (or "polyvinyl alcohol copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain comprising or consisting of vinyl alcohol monomer units, vinyl acetate monomer units, and one or more other monomer units, for example anionic monomer units). In the case of 100% hydrolysis, a polyvinyl alcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety.

Preferably, the polyvinyl alcohol, and/or in case of polyvinyl alcohol blends the individual polyvinyl alcohol polymers and/or the combined polyvinyl alcohol polymers, have an average viscosity (μl) in a range of between 4 mPa·s and 30 mPa·s, preferably between 10 mPa·s and 25 mPa·s, measured as a 4% polyvinyl alcohol polymer solution in demineralized water at 20 degrees C. The viscosity of a polyvinyl alcohol polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight. Thus, the weight-average molecular weight of the polyvinylalcohol can be in a range of 30,000 to 175,000, or 30,000 to 100,000, or 55,000 to 80,000. Preferably, the polyvinyl alcohol, and/or in case of polyvinylalcohol blends the individual polyvinylalcohol polymers, have an average degree of hydrolysis in a range of between 75% and 99%, preferably between 80% and 95%, most preferably between 85% and 95%. A suitable test method to measure the degree of hydrolysis is as according to standard method JIS K6726.

Preferably, the water-soluble film comprises a non-aqueous plasticizer. Preferably, the non-aqueous plasticizer is selected from polyols, sugar alcohols, and mixtures thereof. Suitable polyols include polyols selected from the group consisting of glycerol, diglycerin, ethylene glycol, diethylene glycol, triethyleneglycol, tetraethylene glycol, polyethylene glycols up to 400 molecular weight, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. More preferably the non-aqueous plasticizer is selected from glycerol, 1,2-propanediol, dipropylene glycol, 2-methyl-1,3-propanediol, trimethylolpropane, triethyleneglycol, polyethyleneglycol, sorbitol, or a mixture thereof, most preferably selected from glycerol, sorbitol, trimethylolpropane, dipropylene glycol, and mixtures thereof. One particularly suitable plasticizer system includes a blend of glycerol, sorbitol and trimethylol propane. Another particularly suitable plasticizer system includes a blend of glycerin, dipropylene glycol, and sorbitol. Preferably, the film comprises between 5% and 50%, preferably between 10% and 40%, more preferably between 20% and 30% by weight of the film of the non-aqueous plasticizer.

Preferably, the water-soluble film comprises a surfactant. Preferably, the water-soluble film comprises a surfactant in an amount between 0.1% and 2.5%, preferably between 1% and 2% by weight of the water-soluble film. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably the water-soluble film according to the invention comprises lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film is in a range of from 0.02% to 1.5%, preferably from 0.1% to 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in the water-soluble film is in a range of from 0.1% to 25%, preferably from 1% to 10%, more preferably from 2% to 8%, most preferably from 3% to 5% by weight of the water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the water-soluble film.

Preferably the water-soluble film according to the invention has a residual moisture content of at least 4%, more preferably in a range of from 4% to 15%, even more preferably of from 5% to 10% by weight of the water-soluble film as measured by Karl Fischer titration.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

The film may be opaque, transparent or translucent. The film may comprise a printed area.

The area of print may be achieved using standard techniques, such as flexographic printing or inkjet printing.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

The water-soluble film or water-soluble unit dose article or both may be further coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Preferably, the water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

Liquid Laundry Detergent Composition

The laundry detergent composition is a liquid.

The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules.

The laundry detergent composition can be used in a fabric hand wash operation or may be used in an automatic machine fabric wash operation.

Preferably, the laundry detergent composition comprises a non-soap surfactant. The non-soap surfactant is preferably selected from non-soap anionic surfactant, non-ionic surfactant or a mixture thereof. Preferably, the laundry detergent composition comprises between 10% and 60%, more preferably between 20% and 55% by weight of the laundry detergent composition of the non-soap surfactant. Example weight ratio of non-soap anionic surfactant to nonionic surfactant are from 1:1 to 20:1, from 1.5:1 to 17.5:1, from 2:1 to 15:1, or from 2.5:1 to 13:1.

Preferably, the anionic non-soap surfactant comprises linear alkylbenzene sulphonate, alkyl sulphate, alkoxylated alkyl sulphate or a mixture thereof. Preferably, the alkoxylated alkyl sulphate is an ethoxylated alkyl sulphate.

Preferably, the laundry detergent composition comprises between 5% and 60%, preferably between 15% and 55%, more preferably between 25% and 50%, most preferably between 30% and 45% by weight of the detergent composition of the non-soap anionic surfactant.

Preferably, the non-soap anionic surfactant comprises linear alkylbenzene sulphonate and alkoxylated alkyl sulphate, wherein the ratio of linear alkylbenzene sulphonate to alkoxylated alkyl sulphate preferably the weight ratio of linear alkylbenzene sulphonate to ethoxylated alkyl sulphate is from 1:2 to 9:1, preferably from 1:1 to 7:1, more preferably from 1:1 to 5:1, even more preferably from 1:1 to 4:1. The alkoxylated alkyl sulphate can be derived from a synthetic alcohol or a natural alcohol, or from a blend thereof, pending the desired average alkyl carbon chain length and average degree of branching. Preferably, the synthetic alcohol is made following the Ziegler process, OXO-process, modified OXO-process, the Fischer Tropsch process, Guerbet process or a mixture thereof. Preferably, the naturally derived alcohol is derived from natural oils, preferably coconut oil, palm kernel oil or a mixture thereof.

Preferably, the laundry detergent composition comprises between 1% and 25%, preferably between 2% and 20%, most preferably between 3% and 15% by weight of the laundry detergent composition of a non-ionic surfactant. The non-ionic surfactant is preferably selected from alcohol alkoxylate, Ziegler-synthesized alcohol alkoxylate, an oxo-synthesized alcohol alkoxylate, Guerbet alcohol alkoxylates, alkyl phenol alcohol alkoxylates or a mixture thereof.

Preferably, the liquid laundry detergent composition comprises between 1.5% and 20%, more preferably between 2% and 15%, even more preferably between 3% and 10%, most preferably between 4% and 8% by weight of the laundry detergent composition of soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine.

Preferably, the laundry detergent composition comprises a non-aqueous solvent, preferably wherein the non-aqueous solvent is selected from 1,2-propanediol, dipropylene glycol, tripropyleneglycol, glycerol, sorbitol, polyethyleneglyceol, polypropylene glycol, or a mixture thereof, preferably wherein the polypropyleneglycol has a molecular weight of 400. Preferably the liquid laundry detergent composition comprises between 10% and 40%, preferably between 15% and 30% by weight of the liquid laundry detergent composition of the non-aqueous solvent. Without wishing to be bound by theory the non-aqueous solvents ensure appropriate levels of film plasticization so the film is not too brittle and not too 'floppy'. Without wishing to be bound by theory, having the correct degree of plasticization will also facilitate film dissolution when exposed to water during the wash process.

Preferably, the liquid laundry detergent composition comprises between 0.5% and 15%, preferably between 5% and 13% by weight of the liquid laundry detergent composition of water.

Preferably, the laundry detergent composition comprises an ingredient selected from the list comprising cationic polymers, polyester terephthalates, amphiphilic graft co-polymers, carboxymethylcellulose, enzymes, perfumes, encapsulated perfumes, bleach or a mixture thereof.

The laundry detergent composition may comprise an adjunct ingredient, wherein the adjunct ingredient is selected from ethanol, hueing dyes, aesthetic dyes, enzymes, builders preferably citric acid, chelants, cleaning polymers, dispersants, dye transfer inhibitor polymers, fluorescent whitening agent, opacifier, antifoam, preservatives, anti-oxidants, or a mixture thereof. Preferably the chelant is selected from aminocarboxylate chelants, aminophosphonate chelants, or a mixture thereof.

Preferably, the laundry detergent composition has a pH between 6 and 10, more preferably between 6.5 and 8.9, most preferably between 7 and 8, wherein the pH of the laundry detergent composition is measured as a 10% dilution in demineralized water at 20° C.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition. When Newtonian the composition may have a viscosity value, at a shear rate of 20 s−1 and a temperature of 20° C., of 100 to 3,000 cP, alternatively 200 to 2,000 cP, alternatively 300 to 1,000 cP, following the method described herein. When non-Newtonian, the composition may have a high shear viscosity value, at a shear rate of 20 s−1 and a temperature of 20° C., of 100 to 3,000 cP, alternatively 300 to 2,000 cP, alternatively 500 to 1,000 cP, and a low shear viscosity value, at a shear rate of 1 s−1 and a temperature of 20° C., of 500 to 100,000 cP, alternatively 1000 to 10,000 cP, alternatively 1,300 to 5,000 cP, following the method described herein. Methods to measure viscosity are known in the art. According to the present disclosure, viscosity measurements are carried out using a rotational rheometer e.g. TA instruments AR550. The instrument includes a 40 mm 2° or 1° cone fixture with a gap of around 50-60 μiη for isotropic liquids, or a 40 mm flat steel plate with a gap of 1000 μiη for particles containing liquids. The measurement is carried out using a flow procedure that contains a conditioning step, a peak hold and a continuous ramp step. The conditioning step involves the setting of the measurement temperature at 20° C., a pre-shear of seconds at a shear rate of 10 sl, and an equilibration of 60 seconds at the selected temperature. The peak hold involves applying a shear rate of 0.05 sl at 20° C. for 3 min with sampling every 10 s. The continuous ramp step is performed at a shear rate from 0.1 to 1200 sl for 3 min at 20° C. to obtain the full flow profile.

Use

An aspect of the present invention is the use of a water-soluble unit dose article according to the present invention to reduce instances of unit dose articles sticking together on a transfer belt.

Method of Washing

A further aspect of the present invention is a method of washing comprising the steps of adding the water-soluble unit dose article according to the present invention to sufficient water to dilute the laundry detergent composition by a factor of at least 200 fold, preferably between 250 and 3000 fold, more preferably between 250 and 1500 fold, most preferably between 500 and 1500 fold to create a wash liquor and contacting fabrics to be washed with said wash liquor.

Without wishing to be bound by theory, when the water-soluble unit dose article is added to water, the water-soluble film dissolves releasing the internal laundry detergent composition into the water. The laundry detergent composition disperses in the water to create the wash liquor.

Preferably the wash liquor may comprise between 10 L and 75 L, preferably between 20 L and 70 L, more preferably between 30 L and 65 L of water.

Preferably, the wash liquor is at a temperature of between 5° C. and 90° C., preferably between 10° C. and 60° C., more preferably between 12° C. and 45° C., most preferably between 15° C. and 40° C.

Preferably, washing the fabrics in the wash liquor takes between minutes and 50 minutes, preferably between 5 minutes and 40 minutes, more preferably between minutes and 30 minutes, even more preferably between 5 minutes and 20 minutes, most preferably between 6 minutes and 18 minutes to complete.

Preferably, the wash liquor comprises between 1 kg and 20 kg, preferably between 5 kg and 20 kg, most preferably between 10 and 20 kg of fabrics.

The wash liquor may comprise water of any hardness preferably varying between 0 gpg to 40 gpg.

Process of Making

Those skilled in the art will know how to make a water-soluble unit dose article and laundry detergent composition according to the present invention using techniques known in the art.

More particularly a process for making a water-soluble unit dose article according to the present invention may comprise the steps of;

a. Moving a first water-soluble film in a first direction;
b. Deforming a first part of the first water-soluble film to create a first open compartment;
c. Filling the first open compartment with a treatment composition;
d. Moving a second water-soluble film in a second direction and contacting the first film with the second film to close the open compartment to create a first closed compartment;
e. Sealing the first and second film;
f. Moving a third water-soluble film in a third direction and deforming a part of a third water-soluble film to create a second open compartment;
g. Filling the second open compartment with a treatment composition;
h. Closing the second open compartment with the first closed compartment through contacting the second film with the third film;
i. Sealing the third film to the sealed first and second film to create the closed superposed water-soluble unit dose article.

wherein each of steps a-i happen sequentially, or wherein steps f and b happen simultaneously and steps c and g happen simultaneously, or wherein step f happens before step b and step g happens before step c, or a combination thereof.

The above process creates a superposed water-soluble unit dose article comprising 3 water-soluble films.

An alternative process can be used to create a superposed water-soluble unit dose article comprising 4 water-soluble films. Therefore, a process for making a water-soluble unit dose article according to the present invention may comprise the steps of;

a. Moving a first water-soluble film in a first direction;
b. Deforming a first part of the first water-soluble film to create a first open compartment;
c. Filling the first open compartment with a treatment composition;
d. Moving a second water-soluble film in a second direction to close the first open compartment to create a first closed compartment;
e. Sealing the first and second film together;
f. Moving a third water soluble film in a third direction and deforming a part of the third Water-soluble film to create a second open compartment;
g. Filling the second open compartment with a treatment composition;
h. Moving a fourth water-soluble film in a fourth direction to close the open second compartment to create a second closed compartment;
i. Sealing the third and fourth film together;
j. Positioning the first and second closed compartments through contacting the second and fourth films so that the first and second closed compartments are in superposed orientation to one another;
k. Sealing the sealed third and fourth film to the sealed first and second film to create the superposed water-soluble unit dose article, wherein steps a-k can happen sequentially, or wherein steps b-e and f-i may occur simultaneously to one another, or where steps f-i occur before steps b-e, or a mixture thereof.

Preferably the first closed compartment is created on a rotary drum, the second open and closed compartments preferably are created on a horizontal conveyor belt. The sealing process can be selected from a solvent sealing process, a heat sealing process, or a combination thereof, preferably a solvent sealing process, most preferably wherein the sealing solvent comprises preferably consists essentially of water. Sealing solvent can be applied following a direct contact approach such as by using a felt roll, or a non-direct contact approach such as by using a spray sealing approach. Film deformation processes can be selected from thermoforming, vacuum forming, or a combination thereof. Preferably a web of superposed water-soluble unit dose articles is created through above processes which are consequently cut into individual water-soluble unit dose articles, followed by transferring them over a transfer belt to a packing unit to dose them into a packaging container, preferably selected from a box, a tub or a bag.

EXAMPLES

Water-soluble unit dose articles were made on a pilot plant scale one-lane converter running at a line speed of 7.2 m/minute using the process described above. A first cavity was made comprising a footprint of 41 mm×43 mm and a liquid volume of either 12.3 ml (according to the present invention) or 17.3 ml (comparative example). Smaller, superposed, cavities were made having a combined volume of 4.7 ml on a rotary drum positioned on top of the converter. The total liquid volume was either 17 ml (according to the present invention) or 22 ml (comparative example). Sealing water was applied at a coat weight of 17.3 gsm.

Each of the cavities contained the following detergent composition:

| Ingredients | Composition (wt %) |
|---|---|
| Fatty alcohol ethoxylate non-ionic surfactant, $C_{12-14}$ average degree of ethoxylation of 7 | 3.5 |
| Lutensol XL100 | 0.4 |
| Linear $C_{11-14}$ alkylbenzene sulphonate | 24.2 |
| C12-15 AE3S Ethoxylated alkyl sulphate with an average degree of ethoxylation of 3 | 12.3 |
| Citric acid | 0.7 |
| Palm Kernel Fatty acid | 5.2 |
| Nuclease enzyme* (wt % active protein) | 0.009 |
| Protease enzyme (wt % active protein) | 0.05 |
| Amylase enzyme (wt % active protein) | 0.004 |
| Xyloglucanase enzyme (wt % active protein) | 0.005 |
| Mannanase enzyme (wt % active protein) | 0.003 |
| Lipase enzyme (wt % active protein) | 0.012 |
| Ethoxylated polyethyleneimine** | 1.5 |
| Amphiphilic graft copolymer*** | 2.0 |
| Zwitterionic polyamine**** | 1.8 |
| Anionic polyester terephthalate***** | 0.4 |

-continued

| Ingredients | Composition (wt %) |
|---|---|
| HEDP chelant | 2.2 |
| Brightener 49 | 0.3 |
| Silicone anti-foam | 0.3 |
| Hueing dye | 0.04 |
| 1,2 PropaneDiol | 13.6 |
| Glycerine | 6.0 |
| DPG (DiPropyleneGlycol) | 0.8 |
| TPG (TriPropyleneGlycol) | 0.06 |
| Sorbitol | 0.6 |
| Monoethanolamine | 10.0 |
| K2SO3 | 0.4 |
| MgCl2 | 0.3 |
| Water | 10.9 |
| Hydrogenated castor oil | 0.1 |
| Perfume | 1.6 |
| Aesthetic dye & Minors (incl. preservative) | Balance to 100 |
| pH (10% product concentration in demineralized water at 20° C.) | 7.4 |

*Nuclease enzyme is as claimed in co-pending European application 19219568.3

**Lutensol FP620 ex BASF - ethoxylated polyethyleneimine (PEI600 EO20)

***polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains

****Lutensit Z96 (zwitterionic polyamine ex BASF - zwitterionic hexamethylene diamine according to below formula : 100% quaternized and about 40% of the polyethoxy (EO24) groups are sulfonated).

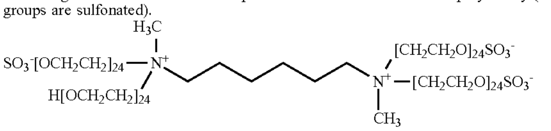

*****Texcare SRA300 ex Clariant

Water-Soluble Film 1:

Polyvinyl alcohol consisting of polyvinyl alcohol homopolymer: polyvinyl alcohol homopolymer blend, as received from the MonoSol company and used as middle film in Ariel All-in-1 Pods, as commercially available in the UK in October 2022.

Water-Soluble Film 2:

Polyvinyl alcohol comprising anionic polyvinyl alcohol copolymer: polyvinyl alcohol homopolymer/anionic polyvinyl alcohol copolymer blend, as received from the MonoSol company and used as outer film in Ariel All-in-1 Pods, as commercially available in the UK in October 2022.

Test Method

This test method determines the coefficient of friction using the Thwing Albert Friction/Peel Tester Model 225-1 instrument. Friction is defined as the resisting force which arises when one substance slides or tends to slide over the surface of another substance. The Coefficient of Friction is the ratio of the frictional resistance to the normal pressure acting on the two surfaces on contact. Static Coefficient of Friction is defined as the frictional resistance before sliding takes place between two materials. Kinetic Coefficient of Friction is defined as the frictional resistance during sliding between two materials and depends to some extent on the relative motions of the materials. The static coefficient of friction is considered versus an Aluminium surface in order to assess the ability of a water-soluble unit dose article to start moving around on the transfer line, while the kinetic coefficient of friction is considered versus the water-soluble film in order to assess the ability of water-soluble unit dose articles to start connecting hence sticking to each other. The higher the kinetic coefficient of friction the higher the risk of water-soluble unit dose articles sticking together and hence blocking transfer lines or leading to miscounts in the final packaging.

Results

| Coefficient of friction | Comparative Example 1 | Inventive Example 1 | Comparative Example 2 | Comparative Example 3 |
|---|---|---|---|---|
| Volume | 17 ml | 17 ml | 22 ml | 22 ml |
| Water-soluble film | 1 | 2 | 1 | 2 |
| Static friction* | 1.20 | 0.44 | 0.60 | 0.27 |
| Kinetic friction* | 1.20 | 0.80 | 0.89 | 0.69 |

*A delta of 0.3 representing significance limit

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A unit dose article comprising a water-soluble film and at least one liquid detergent composition, wherein each liquid detergent composition is encapsulated within a compartment formed by the water-soluble film;

wherein the unit dose article comprises at least a first compartment and at least a second compartment, wherein the second compartment is superposed relative to the first compartment, and wherein each compartment is formed by a seal which surrounds the compartment to contain the liquid detergent composition;

wherein the water-soluble film comprises polyvinyl alcohol polymer and wherein the polyvinyl alcohol polymer comprises an anionic polyvinyl alcohol copolymer, or a blend of anionic polyvinyl alcohol copolymers; and wherein the total volume of the liquid detergent composition is from 12 ml to 18 ml.

2. The unit dose article according to claim 1 wherein the liquid detergent composition comprises between 5% and 60% by weight of the detergent composition of a non-soap anionic surfactant.

3. The unit dose article according to claim 1 wherein the liquid detergent composition comprises between 1% and 25% by weight of the laundry detergent composition of a non-ionic surfactant.

4. The unit dose article according to claim 1 wherein the liquid detergent composition comprises between 0.5% and 15% of the liquid laundry detergent composition of water.

5. The unit dose article according to claim 1 wherein the water-soluble film comprises anionic polyvinylalcohol copolymers selected from sulphonated and carboxylated anionic polyvinylalcohol copolymers.

6. The unit dose article according to claim 1 wherein the water-soluble film comprises a blend of a polyvinylalcohol homopolymer and a carboxylated anionic polyvinylalcohol copolymer, and the polyvinylalcohol homopolymer and the anionic polyvinylalcohol copolymer are present in a relative weight ratio of 70/30 to 50/50.

7. The unit dose article according to claim 1 wherein the water-soluble film comprises a polyvinylalcohol that consists of a carboxylated anionic polyvinylalcohol copolymer.

8. The unit dose article according to claim 2, wherein the non soap surfactant comprises non soap anionic surfactant and non ionic surfactant.

9. The unit dose article according to claim 1, wherein the liquid detergent composition comprises a non soap anionic surfactant and a non ionic surfactant, and wherein the weight ratio of non soap anionic surfactant to non ionic surfactant is from 1:1 to 20:1.

10. The unit dose article according to claim 1, wherein the liquid detergent composition comprises a non soap anionic surfactant, and wherein the non soap anionic surfactant comprises a surfactant selected from linear alkylbenzene sulfonate, alkyl sulfate, alkoxylated alkyl sulfate, and mixtures thereof.

11. The unit dose article according to claim 1, wherein the liquid detergent composition comprises linear alkylbenzene sulfonate and an alkoxylated alkyl sulfate, and wherein the weight ratio of linear alkylbenzene sulfonate to the alkoxylated alkyl sulfate is from 1:2 to 9:1.

12. The unit dose article according to claim 1, wherein the liquid detergent composition further comprises from 1.5% to 20% by weight of the liquid detergent composition of a fatty acid, or the salt thereof.

13. The unit dose article according to claim 1, wherein the liquid detergent composition further comprises from 10% to 40% by weight of the liquid detergent composition of a non-aqueous solvent.

14. The unit dose article according to claim 1, wherein the liquid detergent composition has a pH between 6 and 10, wherein the pH of the laundry detergent composition is measured as a 10% solution in demineralized water at 20° C.

15. The unit dose article according to claim 1, wherein the unit dose article comprises at least a third compartment, and wherein the third compartment is superposed relative to the first compartment and arranged in a side by side configuration with the second compartment.

16. The unit dose article according to claim 1, wherein the unit dose article comprises at least a third and a fourth compartment, and wherein the third and fourth compartments are each superposed relative to the first compartment and arranged in a side by side configuration with the second compartment.

17. The unit dose article according to claim 1, wherein the unit dose article comprises a plurality of compartments and each compartment comprises a liquid detergent composition.

18. The unit dose article according to claim 1, wherein more than 60% by total volume of the liquid detergent composition contained in the unit dose article is comprised in the first compartment.

19. The unit dose article according to claim 1, wherein the liquid detergent composition is a laundry detergent composition.

* * * * *